(12) United States Patent
Heyring et al.

(10) Patent No.: US 6,428,024 B1
(45) Date of Patent: Aug. 6, 2002

(54) CONTROL ARRANGEMENT FOR VEHICLE SUSPENSION SYSTEM

(75) Inventors: Christopher B. Heyring, Eagle Bay; Richard Monk; Michael J Longman, both of Dunsborough; Ray Heslewood, Busselton, all of (AU)

(73) Assignee: Kinetic Limited, Western Australia (AU)

( * ) Notice: Subject to any disclaimer, the term of this patent is extended or adjusted under 35 U.S.C. 154(b) by 0 days.

(21) Appl. No.: 09/367,553

(22) PCT Filed: Feb. 17, 1998

(86) PCT No.: PCT/AU98/00095

§ 371 (c)(1),
(2), (4) Date: Nov. 8, 1999

(87) PCT Pub. No.: WO98/36923

PCT Pub. Date: Aug. 27, 1998

(30) Foreign Application Priority Data

Feb. 19, 1997 (AU) .............................................. PO5169
Nov. 25, 1997 (AU) .............................................. PP0549

(51) Int. Cl.[7] .............................................. B60G 21/05

(52) U.S. Cl. .......................... 280/124.106; 280/124.1; 280/124.159; 280/124.16; 280/124.161

(58) Field of Search .............................. 280/772, 124.1, 280/6.158, 5.505–5.508, 124.106, 124.159, 124.16, 124.161

(56) References Cited

U.S. PATENT DOCUMENTS 3,599,954 A * 8/1971 Yew .............................. 267/34
4,586,728 A * 5/1986 Tokunaga et al. ............ 280/707
4,712,776 A * 12/1987 Geno et al. ................ 267/64.21

(List continued on next page.)

FOREIGN PATENT DOCUMENTS

| EP | 0512358 | 11/1992 | |
| EP | 0783986 | 7/1997 | |
| WO | WO 9701453 | 1/1997 | |
| WO | WO 9706971 A1 * | 2/1997 | ........... B60G/21/02 |
| WO | WO 9828160 | 7/1998 | |

OTHER PUBLICATIONS

Derwent Abstract Accession No. 97–31587/29, Class X22, JP09123728A (Kayaba and Co., Ltd) May 13, 1997.

Primary Examiner—Lanna Mai
Assistant Examiner—Paul Royal, Jr.
(74) Attorney, Agent, or Firm—Birch, Stewart, Kolasch & Birch, LLP

(57) ABSTRACT

A vehicle suspension control system that allows substantially vertical motion of each wheel relative to the vehicle body includes front and rear resilient support means for supporting the body, a front roll stabilization assembly interconnecting at least one forward pair of wheels and a rear roll stabilization assembly interconnecting at least one rearward pair of wheels. Each roll stabilization assembly includes at least one lateral torsion bar (2) and a double-acting hydraulic actuator (3) interconnected to the at least one lateral torsion bar (2), the front and rear hydraulic actuators (3) being interconnected by first and second fluid conduits (5). Roll moments applied to the vehicle body generate pressure within the fluid conduits (5) thereby transmitting the roll moment into each lateral torsion bar (2). Warp motions of the wheels generate flow along the fluid conduits (5) resulting in a displacement of one hydraulic actuator (3) in a proportional and opposite direction to the other hydraulic actuator (3). The front and rear roll stabilization assemblies provide roll stiffness during both roll and warp motions while at the same time providing substantially zero warp stiffness. The system includes an hydraulic fluid supply means (12) and fluid conduit valve means (13) for selectively communicating the fluid conduits (5) with the hydraulic fluid supply means (12) to regulate the average pressure in both fluid conduits (5).

28 Claims, 3 Drawing Sheets

U.S. PATENT DOCUMENTS

| | | | | |
|---|---|---|---|---|
| 4,892,329 A | * | 1/1990 | Kozaki et al. | 280/772 |
| 5,396,423 A | | 3/1995 | Fujimura et al. | |
| 5,597,180 A | * | 1/1997 | Ganzel | 280/772 |
| 5,601,307 A | * | 2/1997 | Heyring et al. | 280/707 |
| 5,630,623 A | * | 5/1997 | Ganzel | 280/772 |
| 5,725,239 A | * | 3/1998 | de Molina | 280/711 |
| 6,302,417 B1 | * | 10/2001 | Heyring | 267/187 |

* cited by examiner

CONTROL ARRANGEMENT FOR VEHICLE SUSPENSION SYSTEM

This application is the national phase under 35 U.S.C. §371 of PCT International Application No. PCT/AU98/00095 which has an International filing date of Feb. 17, 1998, which designated the United States of America.

BACKGROUND OF THE INVENTION

1. Field of the Invention

The present invention is generally directed to vehicle suspension systems, and in particular, to control arrangement for such suspension systems. The present invention will be described in relation to the Applicant's vehicle suspension systems. It is however envisaged the present invention also has general application in vehicle suspension systems.

2. Description of the Related Art

The applicant has developed vehicle suspension systems which utilize lateral stabilizer bars which can be used in conjunction with fluid circuits to thereby provide roll stabilization while facilitating free cross-axle articulation for the suspension system (the cross-axle articulation mode in a common direction with respect to the body, and the other pair of wheels move in the opposite direction. This mode of wheel motion is commonly referred to as warp). Suspension system of this type are described in U.S. Pat. Nos. 6,302,417 and 6,217,047, details of which are incorporated herein by reference. The suspension systems have the advantage of being passive systems which do not require an external energy source to operate properly. By comparison, active suspension systems typically require at least a fluid pump to supply fluid to actuators controlling the wheel motions.

There are however circumstances which make it advantageous to provide a control arrangement to adjust the volume of fluid within the fluid circuits of the Applicant's vehicle suspension systems.

The volume of fluid in the fluid circuits may need to be adjusted for at least the following reasons:

1) To permit levelling of the roll attitude of the vehicle body with respect to the wheels without introducing a bias in one direction in the fluid circuit; and 2) To prevent fluid expansion caused by temperature rises causing over pressure in the fluid circuits. This can be a problem since there is little resilience in the conduits of the fluid circuits and accumulators are normally not provided in the fluid circuits. The addition of accumulators can detract from the roll control of the vehicle where they are provided to accommodate fluid expansion within the fluid circuit because this can result in variation of the roll rates of the vehicle.

The extent of this temperature related problem, can be understood from the following case. When the vehicle is started in the city the system can be set with the correct volume of fluid for the essentially cold start. As it is run at low speed or under stop-start conditions within the city, the temperature in the fluid circuit rises resulting in an increase in the fluid volume therein. It is therefore preferred in this situation, that fluid be released from the circuit. Leaving the city, speeds increase, providing increased air flow over the components of the fluid circuit thereby cooling them down. The fluid then contracts which can leave the suspension system with reduced roll control since any small air bubbles in the fluid circuit can expand resulting in an initial additional compliance about the roll axis of the vehicle. To keep the roll rate constant, the pressure of the fluid in the roll system therefore preferably needs to be kept at an average design pressure.

SUMMARY OF THE INVENTION

It is therefore an object of the present invention to provide a control arrangement for controlling the fluid volume and therefore the pressure within the fluid circuit of a vehicle suspension system.

With this in mind, there is provided a vehicle suspension control system for a vehicle, the vehicle having at least one forward pair of wheels and at least one rearward pair of wheels connected to the body of the vehicle to allow substantially vertical relative motion of each wheel with respect to the body, the suspension system of the vehicle including front and rear resilient support means for supporting the vehicle body with respect to the wheels, a front roll stabilisation assembly interconnecting at least one said forward pair of transversely spaced wheels and a rear roll stabilisation assembly interconnecting at least one said rearward pair of transversely spaced wheels, each roll stabilisation assembly including at least one lateral torsion bar and a double-acting hydraulic actuator interconnected to the at least one lateral torsion bar, the front and rear hydraulic actuators being interconnected by first and second fluid conduits such that roll moments applied to the vehicle body generate pressure within the fluid conduits thereby transmitting the roll moment into each lateral torsion bar to react against at least a portion of said roll moment, and warp motions of the wheels with respect to the vehicle body generate flow along the fluid conduits resulting in a displacement of one said hydraulic actuator in a proportional and opposite direction to the other said hydraulic actuator, the front and rear roll stabiliser assemblies thereby providing roll stiffness during both roll and warp motions of the wheels with respect to the body while at the same time providing substantially zero warp stiffness, wherein the control system includes an hydraulic fluid supply means and fluid conduit valve means for selectively communicating the fluid conduits with the hydraulic fluid supply means to thereby regulate the average pressure in both the first and second fluid conduits.

This control system does not require a fluid pump as fluid is vented from the fluid conduits to the reservoir, or is returned to the fluid conduits from the tank by controlling the valves in each fluid line.

A flow restricting means may be provided for each valve means for preventing rapid discharge of fluid from the fluid conduits.

The valve means may be in the form of an electric solenoid valve having "flow on" and "flow off" positions. The valve may normally be in the flow off position and may be moved to the flow on position when venting fluid from the fluid circuit or when supplying fluid to the fluid circuit is required.

Non-return valve means may optionally be provided in a bypass line bypassing the valve means. The non-return valve means allows the ingress of fluid when the pressure in the fluid circuit falls below a design pressure, for example when there is a drop in temperature in the fluid circuit.

Accumulators may also optionally be provided on each fluid conduit for providing a degree of resilience in the operation of the fluid circuit. This can provide a reduced roll stiffness zone around the level position and reduce the effect of temperature changes on the roll system pressure.

It should be noted that empirical testing has shown that the design pressure of the fluid circuit can be atmospheric (plus whatever head is provided by the position of the fluid tank). This can be desirable for reasons of cost, complexity and reliability. By keeping the design pressures of the hydraulic roll control system low when reacting roll moments on the vehicle body, the amount of additional resilience introduced by the expansion of the flexible hydraulic hoses in roll can be reduced.

Pressure sensing means may be provided for measuring pressure changes in the fluid circuit. The pressure sensing means may be located on the fluid conduits or on the fluid line communicating the valve means with the fluid conduits.

Releasing fluid can be controlled hydraulically or electronically. The electronic option is preferred due to the increased intelligence which can be built in to prevent too much fluid being released from one fluid conduit (the pressure change in the fluid circuit due to temperature effects being determined at least in part by the total volume of fluid in the fluid circuit). For example, to reduce pressure and maintain body roll attitude, fluid should preferably be released from both conduits in the correct proportions. Releasing fluid from just one conduit will reduce pressure, but may also cause the body roll attitude to change. This can be used intelligently to correct for roll attitude errors (although the fluid volume changes due to temperature are small). The method of control for the release of fluid may be pulsed valving with monitoring of body attitude.

According to another aspect of the present invention, there is provided a method of controlling a vehicle suspension system for a vehicle having at least one forward pair of wheels and at least one rearward pair of wheels connected to the body of the vehicle to allow substantially vertical relative motion of each wheel with respect to the body, the suspension system of the vehicle including front and rear resilient support means for supporting the vehicle body with respect to the wheels, a front roll stabilisation assembly interconnecting at least one said forward pair of transversely spaced wheels and a rear roll stabilisation assembly interconnecting at least one said rearward pair of transversely spaced wheels, each roll stabilisation assembly including at least one lateral torsion bar and a double-acting hydraulic actuator interconnected to the at least one lateral torsion bar, the front and rear hydraulic actuators being interconnected by first and second fluid conduits such that roll moments applied to the vehicle body generate pressure within the fluid conduits thereby transmitting the roll moment into each lateral torsion bar to react against at least a portion of said roll moment, and warp motions of the wheels with respect to the vehicle body generate flow along the fluid conduits resulting in a displacement of one said hydraulic actuator in a proportional and opposite direction to the other said hydraulic actuator, the front and rear roll stabiliser assemblies thereby providing roll stiffness during both roll and warp motions of the wheels with respect to the body while at the same time providing substantially zero warp stiffness, the method including selectively communicating the fluid conduits with a hydraulic fluid supply means to thereby regulate the average pressure in both the first and second fluid conduits.

Introducing fluid into the fluid circuit may preferably be achieved by supplementing the volume due to contraction or to level the vehicle. In suspension systems described in International Application No. PCT/AU96/00528, for example in the embodiment shown in FIG. 12 of this application, fluid can simply be supplied to the fluid conduits by opening the valves to allow fluid flow from the fluid tank to the conduits. This is because the coil spring support means supporting the vehicle weight also provide a degree of roll control.

However, in the case of the suspension systems described in U.S. Pat. No. 6,217,047, where the support means supporting the weight of the vehicle may provide substantially no roll control, an alternative procedure is required. Referring to FIG. 4 of said application, which shows a vehicle suspension system using laterally connected air springs to support the vehicle weight, this may require temporarily blocking off of the interconnection between the air springs to provide a degree of roll stiffness for the air springs. The fluid circuit can then be vented to the tank—detection of cornering preferably being provided to ensure that the vehicle is not left with reduced roll stiffness at an inopportune time. The body can then be levelled on the air spring support system using any known trim method and the fluid circuit then resealed. With the fluid circuit once again providing roll stiffness, the air spring interconnections can then be reopened.

Using the roll system to react any eccentric loads on the body can produce an uneven roll stiffness left to right, especially if the roll movement generated by the load is large and if the roll system is provided with a reduced stiffness zone about the level roll attitude position for comfort (as provided by the optional accumulators). The roll system may still be periodically vented to maintain a substantially constant working pressure when the vehicle is running in a straight line.

Therefore another arrangement of the levelling system may be applied to a vehicle suspension system having front and rear stabiliser bars interconnected by an hydraulic interconnection and supports which are laterally interconnected at one end of the vehicle and independent at the other. The independent pair of supports may be used to level the roll attitude of the vehicle in addition to providing height control of the associated end of the vehicle body. The interconnected supports providing control of the height of the other end of the vehicle body. Wheel position sensors may be used to monitor the position of each wheel to determine the height and roll attitude of the vehicle body in relation to the average ground plane and also the degree of the warp of the ground plane. A controller may use these wheel position inputs to calculate the need for any change in the volume of the fluid in the support means. The controller may also have a height selector input such that the driver may select between different heights of the vehicle body. These height inputs may be overridden by the controller in dependence, for example, on an input relating to the speed of the vehicle. The controller may also have different modes of adjustment each having either different speeds of operation, wheel position sensor sampling times and speeds, control valve opening times and/or wheel position tolerances in the acceptable set up. The operation between these modes may be determined by inputs such as vehicle speed, wheel positions being within or outside tolerance bands and ignition on or off signals. One mode may be operational for preset time after the ignition has been switched off.

If periodical venting of the roll system is used, this venting may be subject to a signal indicating a lateral acceleration below a preset level. The system may also be vented before, during or after a support system levelling or height change operations to ensure that any bias in the roll system is removed and does not prevent the correct set up of the system. The venting system may include an hydraulic tank which the roll system circuits are vented to. The tank may be pressurised using the fluid pressure source from the support system.

The detection of cornering can be done by any known means although a lateral acceleration sensor may preferably be provided to give the input to a variable roll moment distribution/wheel lift lockout controller. If a cornering detection device or method is used, it may be preferable to prevent any levelling operations when cornering is detected.

If a roll system is provided with the optional accumulators, the need to control the fluid volume within the circuits with pressure change is negated by the ability of the accumulators to absorb a small increase in fluid volume with little resultant pressure change. The roll system can therefore be sealed if there is provided at least one accumulator for each roll circuit. To reduce the delay in turn-in response of a roll system with additional resilience provided by hydropneumatic accumulators, the accumulators may be locked off from the roll circuits when cornering is detected. This allows at least two different roll stiffness rates to be provided by the system, a high roll stiffness to limit roll in corners and a reduced roll stiffness for most other situations which increases comfort. In order to speed the response time of the control system in detecting cornering, a simple steering angle input (or a function of steering angle and speed for example) may be used to initially trigger the locking off of the accumulators. However, if through this simple control the accumulators are locked off needlessly, a check may be done, based on a function of for example, the steering angle, rate of change of steering angle, vehicle speed and the lateral acceleration and/or yaw of the vehicle body. The accumulators may be connected to the roll circuits via simple multi-stage dampers and lockout valves and/or variable restrictors. If roll moment distribution changing lockouts are provided, there must be at least one accumulator for both parts of both roll circuits. Alternatively, since the roll moment distribution changing lockouts and the accumulator lockouts have similar control inputs, they may be activated by a single controller. This may negate the need for more than one accumulator in the upper roll circuit and one in the lower roll circuit.

It will be convenient to further describe the invention by reference to the accompanying drawings which illustrate possible embodiments of the present invention. Other embodiments of the invention are possible and consequently the particularity of the accompanying drawings is not to be understood as superseding the generality of the preceding description of the invention. Common reference numerals are used for similar parts between drawings.

DETAILED DESCRIPTION OF THE PREFERRED EMBODIMENT

Figure 1:
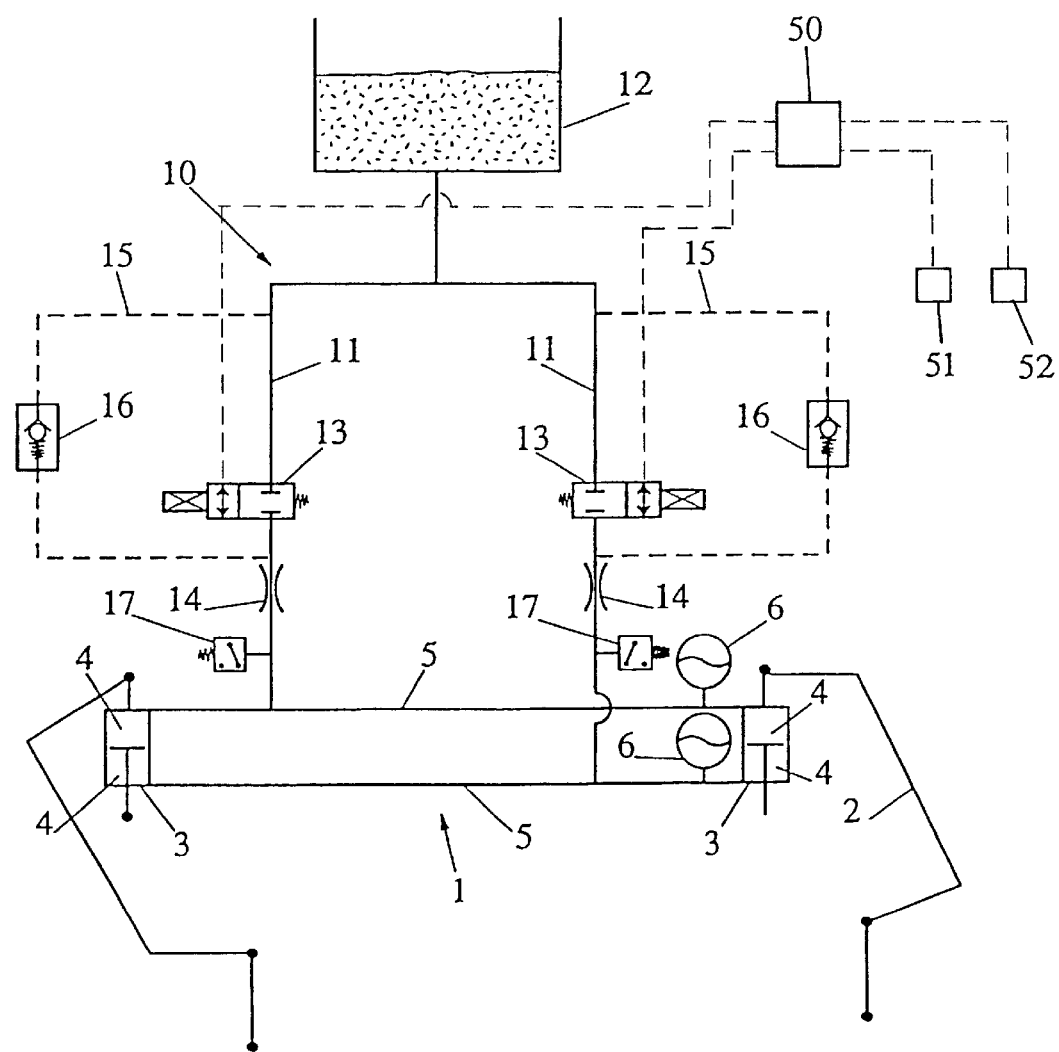
FIG. 1 is a schematic view of a control arrangement according to the present invention.
Figure 2:
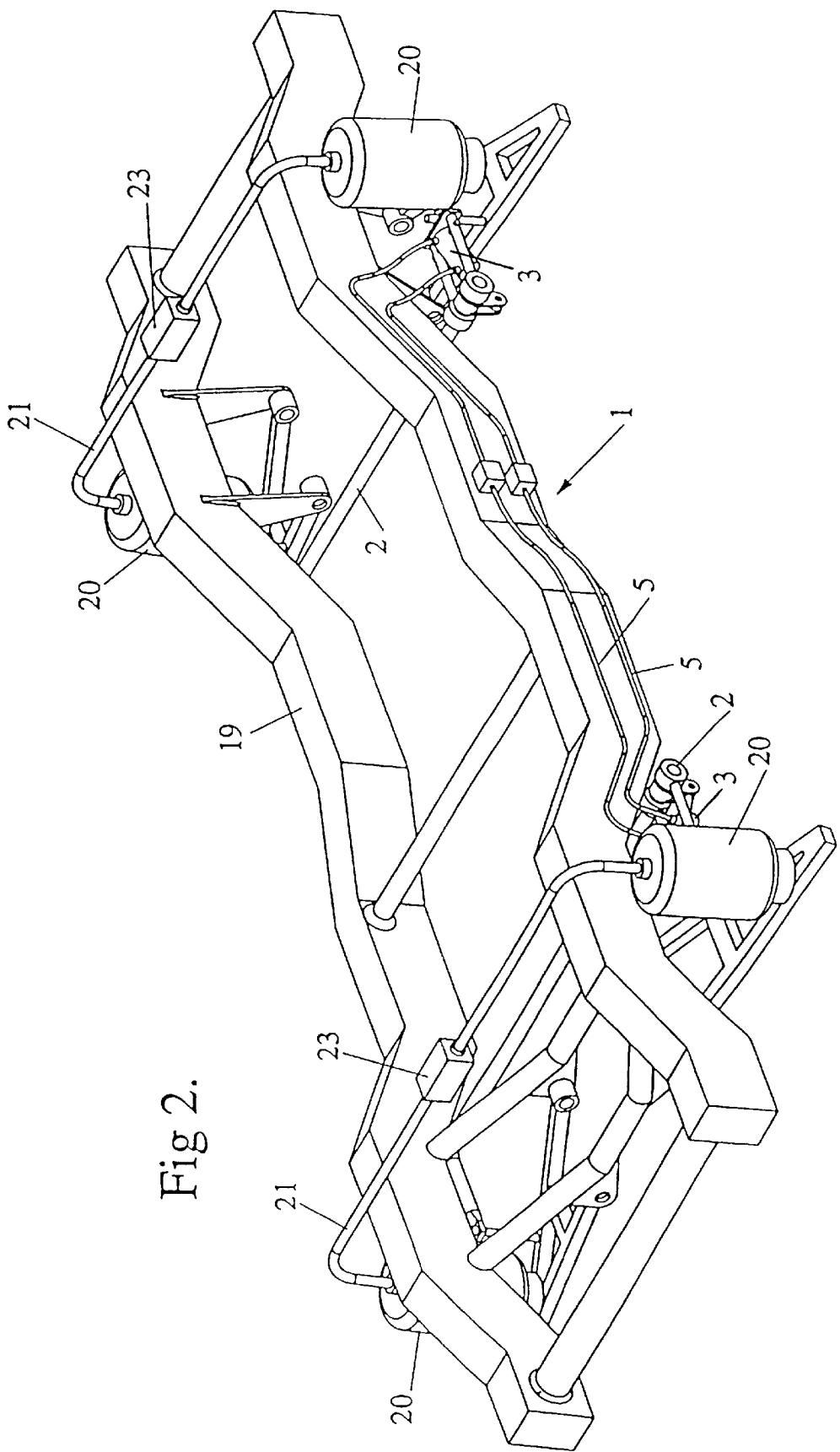
FIG. 2 is a perspective view of a vehicle suspension system incorporating a fluid circuit adapted for connection to the control arrangement as shown in FIG. 1.

The control arrangement according to the present invention as shown in FIG. 1 controls the fluid volume within the fluid circuit 1 of a vehicle suspension system. The vehicle suspension system includes a stabilizer bar 2 located between each pair of support means of the vehicle as shown in FIG. 2. A double acting actuator 3 is connected to each of the stabilizer bars 2. Each double acting actuator 3 has two fluid chambers 4 which are interconnected by means of fluid conduits 5. Further details of the interconnected of the fluid circuit 1 and the stabilizer bars 2 are described in U.S. Pat. Nos. 6,302,417 and 6,217,047.

Although the double acting actuators have been illustrated as hydraulic cylinders throughout, it should be understood that other forms of fluid actuating device may be substituted. For example, rotary actuators may be used at one or both ends of the vehicle as detailed in the applicants aforementioned applications.

The control arrangement 10 includes a respective fluid line 11 in fluid communication with each of the conduits 5 of the fluid circuit 1. The fluid lines 11 are connected to a fluid reservoir 12 to which fluid from the fluid circuit 1 can be vented, and from which fluid can be supplied to the fluid circuit 1.

Each fluid line 11 includes a solenoid valve 13 for controlling the fluid flow through the fluid line 11. Each solenoid valve has a "flow on", and "flow off" position. In FIG. 1, the solenoid valve 13 is shown in its "flow off" position. A flow restrictor 14 is also provided on each fluid line 11. This restrictor prevents any rapid discharge of fluid from the fluid conduits 5 during venting of the fluid circuit 1 which could occur, for example, when the vehicle experiences a single wheel bump during the venting procedure.

Bypass lines 15 shown in dotted lines may also optionally be provided on each fluid line 11. The bypass line 15, which bypasses the solenoid valve 13, supports a non-return valve 16. This non-return valve 16 allows ingress of fluid from the reservoir 12 to the fluid conduits 5 when the pressure in the fluid circuit 1 falls below a design pressure. This design pressure may for example be atmospheric. Pressure drops can occur as a result of a drop in temperature of the fluid within the fluid circuit 1.

A pressure switch 17 can also be provided to determine changes in pressure in the fluid circuit 1. Although the pressure switch 17 is shown on the fluid line 11 in FIG. 1, this switch can be located anywhere between the actuator 3 and the restrictor 14.

Accumulators 6 may optionally be provided on each of the fluid conduits 5. This is particularly useful since they may be used not only to keep the pressure in the conduits during straight line running within a designed range, but may also be used to provide a degree of initial additional resilience in the roll stiffness of the suspension system thereby improving comfort over single use wheel bumps and reducing sudden roll accelerations of the body, which cause "head toss". The accumulators may preferably be locked of or restricted during roll of the vehicle to improve the response and control of the suspension system, although the valves to do this are not shown in FIG. 1. It may be desirable to use four accumulators (one for each individual volume of fluid) where roll moment distribution changing lock-outs are provided in the systems as shown in U.S. Pat. No. 6,217,047, to prevent excessive changes in the roll moment distribution of the suspension system in one direction.

FIG. 2 shows a vehicle chassis 19 supported by a vehicle suspension system as described in U.S. Pat. No. 6,217,047. This suspension system includes air springs 20 to support the weight of the vehicle. Each pair of air springs are interconnected by a lateral conduit 21. During normal operation of the suspension system, the lateral conduit 21 remains open to allow flow of air between the connected air springs 20. A lock out valve 23 is however also provided on the lateral conduit 21 to control the flow of air therethrough.

The stabiliser bars 2 are interconnected by a fluid circuit 1 incorporating fluid conduits 5, which are located along the side of the vehicle chassis 19.

The control arrangement for the suspension system shown in FIG. 2 may be used to control the fluid volume within the fluid circuit 1 without the requirement for a fluid pump for the circuit 1. Adding fluid pumps into the system to power the fluid circuit 1 adds cost and can introduce reliability problems and aerate the fluid. It is therefore advantageous to use the support means to ensure the correct amount of fluid is in each of the roll conduits 5 by using the support means to level the roll attitude of the vehicle whilst pulsing or holding open the roll conduit valves 13.

Under normal operating conditions of the vehicle, the fluid circuit 1 in conjunction with the stabiliser bars 2 provide substantially all of the roll control for the vehicle. During any venting of fluid from the fluid circuit 1 or during any supply of fluid to the fluid circuit 1, one of the front or rear conduit lock out valves 23 is closed to thereby prevent air flow between the adjacent air springs 20. This ensures that the air springs 20 provide temporary roll support for the vehicle while the venting or supply procedure for the fluid circuit 1 is completed by the control arrangement. The air springs 20 generally do not provide enough roll stiffness to limit the roll attitude of the body to an acceptable amount during cornering even when the lateral interconnecting conduit 21 is blocked. They may however be used to level the roll attitude of the vehicle while the vehicle is stationary or moving in a straight line and the fluid circuit 1 is either held open or periodically pulsed (to prevent any possible rapid changes in roll attitude). The individual air springs 20 can then be powered, using their-associated height adjusting control system to level the roll attitude of the vehicle. Once the vehicle is level and the venting or supply procedure is completed (ie the roll circuits are resealed) or when cornering is detected, the lock out valve 23 is reopened to thereby allow air flow between the adjacent air springs 20, with the fluid circuit 1 and stabiliser bars 2 again providing the roll control for the vehicle.

Preferably an electronic controller 50 is provided to link the air spring leveling operations with the pulsing of the roll conduit valves 13 to improve the accuracy and speed of the set-up. Additionally, at least one of either a speed sensor 51 or a lateral acceleration sensor 52 should be provided to ensure that the set-up operations described above only take place when it is safe to do so. For example, if a speed sensor 51 is provided and it detects that the vehicle is stationary, the roll conduit valves 13 may be held open continuously to further speed the set-up. When the vehicle is cornering, a lateral acceleration sensor 52 can detect the lateral g-force and ensure that the roll conduit valves 13 are held closed and the lateral air conduit 21 is held open to give the design roll moment distribution for safe handling.

Optionally, the air springs 20 can even be used to "over adjust" the roll attitude of the body to compensate for any roll moment produced by eccentric loading of the vehicle. Using this method, when the fluid circuit 1 is closed to once again provide roll control and the air support lockout valves are reopened, a bias is put onto the stabiliser bars 2 to compensate for the eccentric loading and return the body roll attitude to level in normal operation.

Using the roll system to react forces caused by eccentric loads as described above, pre-loads the roll system in one direction. This can exaggerate any non-linearities in the roll stiffness by giving a different initial roll stiffness from left to right (and therefore different rates of steering response). This is obviously an undesirable effect and is especially prevalent on systems with additional resilient means to improve comfort such as accumulators. Furthermore, if to maintain the correct roll attitude of the vehicle body, the pressure in the roll conduits 5 needs to be different from one to the other to react an eccentric roll moment, the conduits 5 cannot have their pressure regulated to be the same average amount. This can prevent the use of the roll conduit valves 13 from regulating the pressure in the conduits 5 to prevent significant changes due to temperature effects or leakage. Thus, in an alternative arrangement, one laterally adjacent pair of the vehicle supports (in this case the air springs) may, during normal operation of the vehicle, be used to react any roll moments-acting on the vehicle due to eccentric loading on the body.

Therefore another possible arrangement of the leveling system will now be described, applied to the suspension system shown in FIG. 4 and described in detail in the aforementioned U.S. Pat. No. 6,217,047. The operation of the levelling system requires one of the air bag cross-link pipes to be blocked or even removed. This ensures that any static roll moments caused by an offset weight on the body are reacted by the support means.

The body is levelled by supplying and releasing air from the two individual and one pair of air bags. The operations required of this three-point levelling system may be determined by a controller using an algorithm based on the applicant's International Application number PCT/AU96/00397, which details an equation linking wheel positions to desired height and the roll moment distribution of the suspension so that an interconnected suspension system may be levelled even when the wheels are on a surface with a significant degree of warp. If this is the case, the wheel positions input to the controller define the warp of the ground surface, as well as the roll, pitch and overall height of the vehicle body with respect to the ground surface. Using the algorithms based on the equations disclosed in PCT/AU96/00397 desired height set points for each wheel can be obtained. Since the pair of wheels with interconnected supports can only alter the height and pitch of the vehicle body, not the roll attitude, the desired set points for the associated wheels can be averaged, with the correct set-up of the vehicle in warp unaffected.

The controller may make height and levelling adjustments in distinct stages. For example, on initial starting of the vehicle, it is desirable that the suspension system be correctly set up before the vehicle is driven since it is likely that some 'settling' will have occurred (ie the vehicle is likely to be too low and may not be level). This may be achieved by a 'continuous' mode where valves may be continuously held open for long periods of time such as until the respective wheels are within a first preset positional tolerance. If the design of the support system control manifold does not allow simultaneous up and down adjustments of separate wheels, or the adjustment of the wheel positions overshoot, it may be necessary to run through the continuous loop several times to get all wheels within the first tolerance as quickly as possible.

If a speed sensor is fitted, the continuous mode may be exited when the vehicle is driven off. This allows the continuous mode to be designed to operate as quickly as possible, whilst preventing undulations in the road surface causing unnecessary adjustments to be made. It allows the hydraulic roll moment reacting system circuit to be left open during the continuous mode (which it would not be safe to do with the vehicle in motion) reducing errors in the support system levelling operations, thus reducing the set up time required.

In pneumatic systems (especially) it may be necessary to set a minimum valve open time to ensure that movement occurs and prevent rapid switching of valves to no effect.

When all the wheel positions have been adjusted within the first tolerance or the vehicle starts to move off, the continuous mode may be terminated and the next level of control may commence.

This next stage, which may be referred to as the 'fast pulsing' mode, operates essentially as its name suggests. The support valves are no longer held open continuously, but pulsed at the end of each sampling loop. The roll attitude control valves may be pulsed once per support valve pulse, preferably for a much shorter period, maybe at either the start or end of each support valve pulse. A lateral acceleration sensor may be used as an input to the ECU to prevent any opening or levelling operations whilst the vehicle is cornering.

The length of time and the number of samples in the sampling loop may also differ from these in continuous mode. Preferably each sampling loop determines the support valve operations required, those operations (and the roll attitude system valve pulses) being carried out for a set period of time before a fresh set of body position samples are taken, and a new set of valve operations determined.

In the fast pulsing mode, the tolerances for the vehicle height and position may be different from those in the continuous mode.

Once the sampling loop has been completed without any further levelling operations being required, the fast pulsing mode can be terminated and a 'maintenance' mode entered.

In the maintenance mode, the sampling rate may be reduced as the time for the sampling loop may be many times longer than in the previously described modes. For example, the sampling loop may be one minute in duration, with a single set of maintenance pulses at the end of each loop. The roll attitude control system valves may be pulsed once every loop regardless of whether any support valves are operated. This ensures that any changes in the static pressure in the roll conduits due to temperature variations, etc. are corrected without the need for any pressure transducers or other sensors. The wheel position tolerances may be similar to these used in the fast pulsing mode.

This maintenance mode is the main mode of operation of the levelling system whilst the vehicle is in use. If the wheel positions drift outside a preset tolerance, requiring a larger, faster levelling adjustment than is possible in maintenance mode, the fast pulsing mode may be resumed until the height and attitude of the vehicle are back within tolerance.

Also, if a height change is manually selected by the driver, or automatically selected by the ECU based on speed and/or other inputs, the fast pulsing mode may be invoked. If the vehicle is stationary, the continuous mode may alternatively be used to achieve a faster set up.

When the engine is switched off, or the ignition is switched off completely and the vehicle is not in use, another mode may be set in operation. This 'settling' mode may include a 'correct on exit' function in addition to a 'level settling' function. Both of these functions may operate in essentially the same manner, the main difference being the frequency with which samples are taken and adjustments made. In both cases preferably only 'down' pulses are used to level the vehicle, preventing the unnecessary depletion of the pressurised fluid in the supply system. The purpose of both functions is to prevent the vehicle body from adopting an unsightly attitude due to any changes in the fluid volumes in the suspension system. The correct on exit function should additionally prevent significant increases in the height of the vehicle body as the vehicle is unloaded.

The air springs used to provide resilient support in pneumatic and hydropneumatic suspension systems typically give a very low stiffness about the ride height of the vehicle to provide a comfortable ride. This can cause significant changes in the height of the vehicle body as the load on it changes. For example, at the end of a journey when the vehicle comes to rest and the ignition is turned off, the continuous, fast pulsing and maintenance modes are disabled to limit the drain on the main vehicle battery. As the passengers alight, the load on the vehicle body reduces, which may cause a noticeable increase in the height of the body. Since the other modes have been disabled, the correct on exit function can be set to allow levelling operations at a certain frequency for, say, the first ten or fifteen minutes after vehicle use. At the end of this period, the mode of operation of the ECU may then change to a level settling function alone. As mentioned above, this may essentially only involve a change in the frequency of operation of the levelling system.

Although the description of the above 'three-point' levelling system may preclude the use of interconnected air bags at both ends of the vehicle in on-road driving (for vehicles with significant weight offsets to one side, in order to maintain a level roll attitude and even roll stiffness left to right), it should be understood that during off-road use, the air bags may be reconnected. The benefits afforded by more even wheel loadings may outweigh any disadvantages such as the loss of fine attitude control or uneven roll stiffness left to right due to opening all support cross-links. It may even allow the roll moment distribution to be changed to match the front to rear wheel strokes. If the connection of the second cross-link is controlled by for example the selection of low range gears, the change in roll moment distribution from an acceptable on-road handling balance to one based upon the desired wheel travels, can only take place when large degrees of warp are expected and speeds are low, ie situations where a good handling balance is not essential.

If a speed input is present to the controller, it could additionally or alternatively be used as the means to ensure that the roll moment distribution setting giving excellent off-road characteristics is only available when the vehicle is travelling at low speed. When the roll moment distribution is changed, the corresponding value used in the controller may also be changed to ensure that the controller does not make any unnecessary levelling operations and can still set up the suspension system correctly when the wheels do not all lie in the same plane.

It should be understood that the general concepts described for the suspension system shown in FIG. 2 may be applied to other related suspension systems disclosed in U.S. Pat. No. 6,217,047 such as FIG. 7 of said application. For example, one or both pairs of laterally spaced air bags could be replaced with alternative forms of fluid containers such as hydraulic cylinders used in conjunction with hydropneumatic pressure accumulators. Coil springs may be used in parallel with one or both pairs of fluid containers to support a portion of the vehicle body weight. Similarly, torsion bars may be used to support a portion of that vehicle load instead of coil springs.

Figure 3:
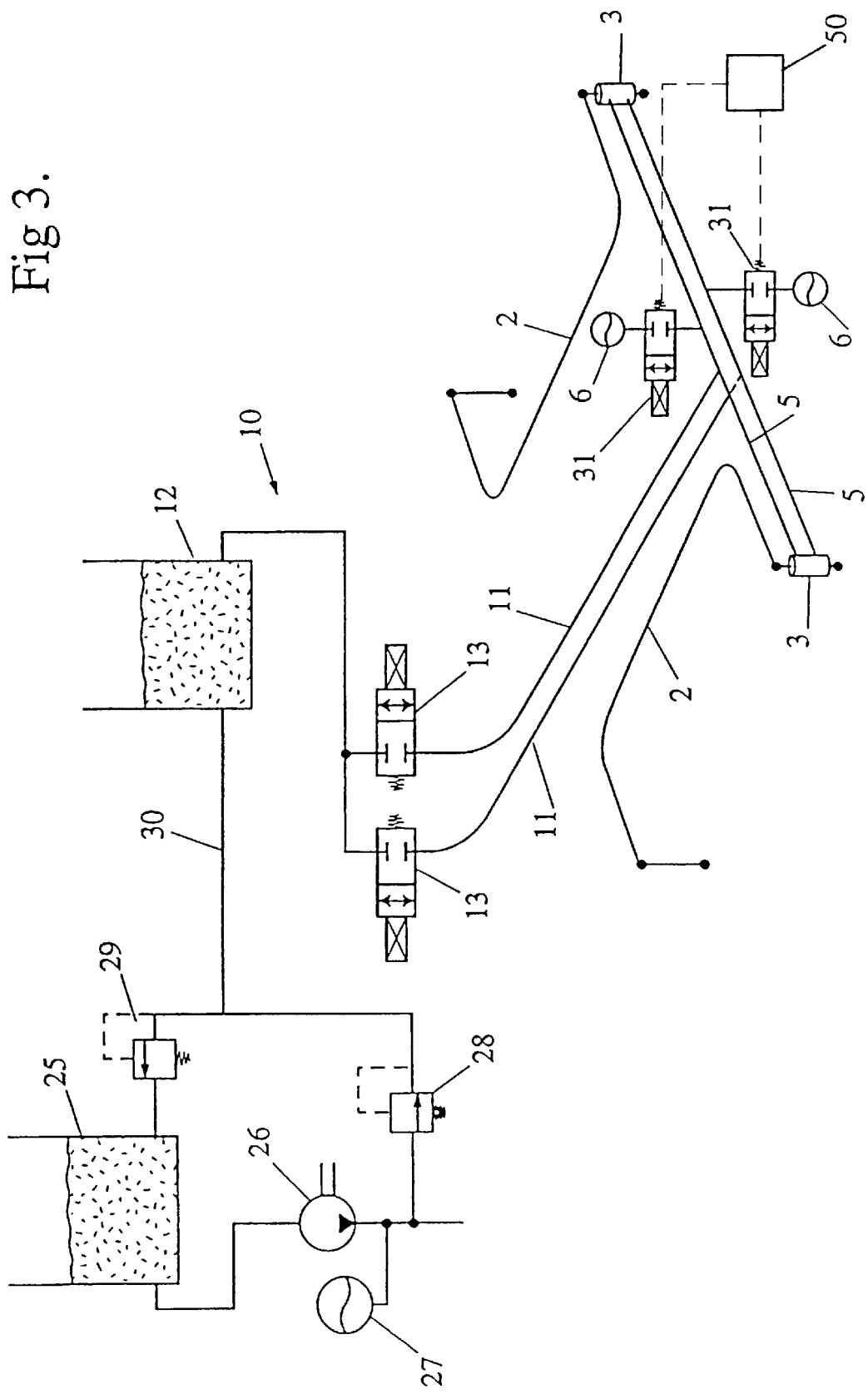
FIG. 3 is a schematic view of an alternative control arrangement according to the present invention, with particular application to the suspension system shown in FIG. 2.

FIG. 3 shows another possible arrangement of the fluid supply and venting system for the hydraulic roll moment reacting system. The stabiliser bars 2, are similar to those in FIG. 1, with each having conventional drop links to the wheel or axle assembly on one side of the vehicle, and an hydraulic cylinder 3 in place of each of the drop links on the opposite of the vehicle. The cylinders are interconnected by fluid conduits 5 such that roll motions are resisted and articulation motions are allowed. Each fluid conduit 5 has a respective fluid line 11 connected thereto for allowing the supply and return of fluid from and to the reservoir 12. Each fluid line 11 includes a solenoid valve 13 for controlling the flow of fluid through the line 11. Flow restrictors may optionally be provided in each line 11 although they are not shown. The fluid reservoir 12 may be sealed and pressurised such that the fluid in the hydraulic roll reacting system may be kept under a regulated pre-charge to reduce possible undesirable effects such as those due to any air trapped in the system and the effects of seal and O-ring movement which can cause a low initial stiffness in the hydraulic system.

The reservoir 12 may contain fluid in a portion of its volume and may be kept within a tolerance of this volume by the operator checking the fluid level through a sight glass on the edge of the tank (for example as part of the vehicle's routine maintenance service or when a warning light is illuminated in the dashboard, warning of a fault with the roll moment reacting system). The air in the remainder of the volume may be pressurised manually, also as part of a service, using a conventional tire pump or garage air line connection through a Schrader valve for example. This is also a simple task which the vehicle owner could do when checking the tire pressures.

If the support system for the vehicle suspension is a pneumatic system, the air reservoir pressure may be used to pressurise the tank. This may be done by a simple line permanently connecting the air suspension supply system to the top of the reservoir 12. This line may include a valve to close the connection in the event of a failure, to preserve the supply system integrity.

Alternatively, and as shown in FIG. 3, the fluid reservoir 12 may be kept at a regulated pressure (or within a tolerance pressure range) using the fluid supply and return system from another pressurized fluid support supply system on the vehicle such as the anti-lock braking system or power steering system for example. If the support system for the vehicle suspension is hydropneumatic, the associated high pressure hydraulic supply system may alternatively be used. Fluid from the tank 25 of this other vehicle system may be pumped into a high pressure accumulator 27 by a pump 26. Since the pressure required for pre-charge in the roll moment reacting system is low, usually between 5 and 20 bar, the pressure in the reservoir 12 may be regulated by bleeding pressurized fluid from the accumulator 27 through the pressure sensing valve 28 and returning fluid to the tank 25 through the pressure relief valve 29. The valve 28 opens when the pressure in the reservoir 12 rises above a second preset point. A restrictor may be placed in the conduit 30, or in series with one or both of the valves 28 and 29. It is usually desirable to prevent the valve 28 from draining the accumulator 27 of too much fluid too quickly, especially if the system it is part of is a safety critical system such as braking or steering. A single pressure regulating valve may be used in place of the two valves 28 and 29.

Also shown in FIG. 3 is an hydropneumatic pressure accumulator 6 on each conduit 5 similar to the arrangement shown in FIG. 1. Each accumulator 6 may be isolated from the conduit 5 by a valve such as the solenoid operated valve 31 shown. The accumulators may be in communication with the conduits 5 in straight line running of the vehicle, but in a turn be locked off by the closing of the valves 31. The valves 31 are preferably normally closed valves so that in the event of a failure, they isolate the accumulators from the conduits to maintain roll control. The accumulator arrangement shown may be used in a sealed roll moment reacting system (i.e. one without the control arrangement 10 or the associated fluid lines 11) since any changes in fluid volume due to temperature effects can be easily absorbed within the accumulator volume for negligible pressure change. This may be preferable, if the accumulators are provided to enhance comfort. However, the servicing of this arrangement requires more specialized equipment to maintain the fluid and gas volumes within acceptable ranges from the life of the vehicle.

The detection of a turn may be done using a number of sensor inputs and algorithms to ensure that the accumulators are looked out quickly, to ensure the turn in of the system is not significantly reduced by the addition of the accumulators. It may be preferable on some types of vehicle, such as sports models, to have the valves 31 close very early, even if the controller cannot be sure that they need to be closed, to ensure that the roll control and turn in are available when needed, giving improved control and steering feel to the driver. If a cornering situation is then not detected, the valves may be released quickly, so that the deterioration in the ride caused by their exclusion is only very temporary. To ensure that the valves are closed in all necessary situations it may be necessary to use a combination of steering angle, rate of change of steering angle, vehicle speed, lateral acceleration and/or rate of yaw inputs. Once the valves have been closed, a check should be done to ensure that the valves are only held closed when necessary. The inputs to the check calculation may be similar to the previous inputs and may also involve some detection of oversteer and other effects which may cause inappropriate valve opening in an over-simplified controller. Additionally, the check calculations may not be performed until after a preset delay (of for example one or two seconds, depending on the vehicle's dynamic characteristics) to allow the vehicle to settle into the manoeuvre or recover from any brief disturbance, before the valves are reopened. The valves may also be used to isolate the accumulators 6 from the conduits 5 on operation of a driver operated switch such as a "sports mode" selector. Detection of accelerating and braking may be provided as well as cornering, the levelling and venting operations being prevented when for example the lateral and longitudinal acceleration levels exceed preset values. This may apply to any one of the conduit pressure regulating systems and any of the height and roll attitude adjustment systems described herein.

The control arrangement of the present invention therefore allows for control of the fluid volume within the fluid circuit. This allows changes in the fluid volume within the fluid circuit to be compensated for to thereby avoid any adverse effects on the response of the vehicle suspension system.

What is claimed is:

1. A control system for a suspension system of a vehicle having at least one forward pair of wheels and at least one rearward pair of wheels connected to a body of a vehicle to allow substantially vertical relative motion of each wheel with respect to the body, the suspension system of the vehicle including front and rear resilient support means for supporting the vehicle body with respect to the wheels, a front roll stabilization assembly interconnecting at least one said forward pair of transversely spaced wheels and a rear roll stabilization assembly interconnecting at least one said rearward pair of transversely spaced wheels, each roll stabilization assembly including at least one lateral torsion bar and a double-acting hydraulic actuator interconnected to the at least one lateral torsion bar, the front and rear hydraulic actuators being interconnected by first and second fluid conduits such that;

roll moments applied to the vehicle body generate pressure within the fluid conduits thereby transmitting the roll moment into each lateral torsion bar to react against at least a portion of said roll moment; and warp motions of the wheels with respect to the vehicle body generate flow along the fluid conduits resulting in a displacement of one said hydraulic actuator in a proportional and opposite direction to the other said hydraulic actuator;

the front and rear roll stabilizer assemblies thereby providing roll stiffness during both roll and warp motions of the wheels with respect to the body while at the same time providing substantially zero warp stiffness;

wherein the control system includes a hydraulic fluid supply and at least one fluid conduit valve for selectively communicating the fluid conduits with the hydraulic fluid supply to thereby regulate the average pressure in both the first and second fluid conduits.

2. The control system as claimed in claim 1, wherein the at least one fluid conduit valve is a normally closed valve, the control system controlling the opening of the valve to allow venting of the fluid conduits when the average pressure within both the fluid conduits varies from a preset pressure.

3. The control system as claimed in claim 2, further including an electronic control unit, the at least one fluid conduit valve being an electrical solenoid valve controlled by said electronic control unit.

4. The control system according to claim 3, further including at least one pressure sensor for measuring pressure variations in the fluid conduits for the electronic control unit.

5. The control system as claimed in claim 3, further including at least one lateral acceleration sensor for detecting lateral accelerations of the vehicle body for the electronic control unit such that the solenoid valve is closed when the lateral acceleration of the vehicle body exceeds a preset amount.

6. The control system as claimed in claim 1, further including an electronic control unit, the at least one fluid conduit valve being an electrical solenoid valve controlled by said electronic control unit.

7. The control system according to claim 1, further including a non-return valve for bypassing each said fluid conduit valve.

8. The control system according to claim 1, wherein the at least one fluid conduit valve includes a restrictor for preventing large volume fluid flows through said at least one fluid conduit valve.

9. The control system according to claim 1, wherein the hydraulic fluid supply is in the form of a hydraulic tank which is pressurized to provide a substantially constant pre-charge in the fluid conduits.

10. The control system according to claim 9, wherein the hydraulic tank is provided with a tank charge valve to allow the pre-charge to be maintained.

11. The control system according to claim 1, further including a hydropneumatic accumulator in fluid communication with each fluid conduit.

12. The control system according to claim 11, further including at least one lock-out valve for selectively closing off the fluid communication of each accumulator with each fluid conduit.

13. The control system according to claim 12, wherein the at least one lock-out valve is controlled by an electronic control unit in accordance with signals generated by sensors in relation to steering input, speed and lateral acceleration.

14. The control system according to claim 13, wherein the at least one lock-out valve is rapidly closed when the electronic control unit detects a rate of change of steering above a predetermined magnitude.

15. The control system according to claim 14, wherein the at least one lock-out valve is reopened when, after a minimum preset time period, the lateral acceleration on the body and the steering angle both fall below preset amounts.

16. The control system according to claim 1, the resilient support means including a fluid container for each wheel for supporting at least a portion of the load on said wheel, each fluid container being independently and selectively connected via a leveling valve to a fluid support supply system including a source of pressurized fluid and a fluid reservoir to thereby allow the height of at least one end of the vehicle and the roll attitude of the vehicle to be adjusted, the leveling valve being operated by an electronic control unit in accordance with wheel position signals from wheel position sensors, the electronic control unit further controlling the operation of the at least one fluid conduit valve to thereby coordinate the operation of the leveling valve and the at least one fluid conduit valve.

17. The control system according to claim 16, the fluid containers at least one end of the vehicle being interconnected by a fluid conduit such that the interconnected fluid containers provide substantially zero roll stiffness at said vehicle end.

18. The control system according to claim 16, wherein at least one pair of the front or rear resilient support means includes additional mechanical support means for each wheel in parallel with the fluid containers for supporting the remainder of the load on the associated wheels.

19. The control system according to claim 16, wherein the fluid support supply system is at least selectively in fluid communication with the hydraulic fluid supply to thereby pressurize the hydraulic fluid supply.

20. A method of controlling a vehicle suspension system for a vehicle having at least one forward pair of wheels and at least one rearward pair of wheels connected to the body of the vehicle to allow substantially vertical relative motion of each wheel with respect to the body, the suspension system of the vehicle including front and rear resilient support means for supporting the vehicle body with respect to the wheels, a front roll stabilization assembly interconnecting at least one said forward pair of transversely spaced wheels and a rear roll stabilization assembly interconnecting at least one said rearward pair of transversely spaced wheels, each roll stabilization assembly including at least one lateral torsion bar and a double-acting hydraulic actuator interconnected to the at least one lateral torsion bar, the front and rear hydraulic actuators being interconnected by first and second fluid conduits such that, roll moments applied to the vehicle body generate pressure within the fluid conduits thereby transmitting the roll moment into each lateral torsion bar to react against at least a portion of said roll moment, and warp motions of the wheels with respect to the vehicle body generate flow along the fluid conduits resulting in a displacement of one said hydraulic actuator in a proportional and opposite direction to the other said hydraulic actuator, the front and rear roll stabilizer assemblies thereby providing roll stiffness during both roll and warp motions of the wheels with respect to the body while at the same time providing substantially zero warp stiffness, the method including selectively communicating the fluid conduits with a hydraulic fluid supply to thereby regulate the average pressure in both the first and second fluid conduits.

21. The method according to claim 20, including sensing the pressure within at least one fluid conduit and communicating the fluid conduits with the hydraulic fluid supply when the sensed pressure deviates from a preset pressure.

22. The method according to claim 20, wherein the selective communicating of the fluid conduit with the hydraulic fluid supply is time based.

23. The method according to claim 20, including locking off the fluid conduits from the hydraulic fluid supply during cornering.

24. The method according to claim 20, the resilient support means provided for at least one end of the vehicle including a fluid container for each wheel for supporting at least a portion of the load on said wheel, each fluid container being independently and selectively connected via of the load on said wheel, each fluid container being independently and selectively connected via a leveling valve to a fluid support supply system including a source of pressurized fluid and a fluid reservoir to thereby allow the height of at least one end of the vehicle and the roll attitude of the vehicle to be adjusted, the leveling valve being operated by an electronic control unit in accordance with wheel position signals from wheel position sensors, the electronic control unit further controlling the communication of the hydraulic fluid supply with the first and second fluid conduits, the method including opening the communication of the hydraulic fluid supply with the first and second fluid conduits at least momentarily during adjustment of the fluid containers.

25. The method according to claim 24, wherein the resilient support means at the first end of the vehicle and at the second end of the vehicle include a fluid container for each wheel for supporting at least a portion of the load on said wheel, the fluid containers at the first end of the vehicle being interconnected by a lateral conduit for providing fluid communication therebetween.

26. The method according to claim 25, wherein the fluid containers at the second end of the vehicle are interconnected by a lateral conduit for providing fluid communication therebetween, the lateral conduit including a lock-out valve, the lock-out valve being closed during adjustment of the fluid containers, the method including opening the lateral conduit lock-out valve when a certain mode of operation is determined, the operations of the leveling valve and communication between the hydraulic fluid supply with the first and second fluid conduits being disabled until the lateral conduit lock-out valve is reclosed.

27. The method according to claim 24, wherein one or more sensors are provided to detect cornering, the electronic control unit preventing any opening of the leveling valve or any communication of the hydraulic fluid supply with the first and second conduits when the cornering is detected.

28. The method according to claim 24, wherein one or more sensors are provided to detect longitudinal acceleration or braking, the electronic control unit preventing any opening of the leveling valve or any communication between the hydraulic fluid supply with the first and second fluid conduits when the longitudinal acceleration or braking are greater than preset levels.

\* \* \* \* \*